US009253603B1

(12) United States Patent
Dong et al.

(10) Patent No.: US 9,253,603 B1
(45) Date of Patent: Feb. 2, 2016

(54) ACCELEROMETER-BASED CALIBRATION OF VEHICLE AND SMARTPHONE COORDINATE SYSTEMS

(71) Applicant: TREND MICRO INCORPORATED, Tokyo (JP)

(72) Inventors: Kan Dong, Nanjing (CN); Xiaoming Zhao, Nanjing (CN); Gang Chen, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 377 days.

(21) Appl. No.: 13/785,906

(22) Filed: Mar. 5, 2013

(51) Int. Cl.
  *H04W 4/02* (2009.01)

(52) U.S. Cl.
  CPC .................................. *H04W 4/027* (2013.01)

(58) Field of Classification Search
  CPC ....... G01C 21/165; G01S 13/50; G01S 13/52; G01S 17/06; G01S 17/46; G01S 19/49; G01S 7/2955; G01S 13/42; H04W 4/046; H04W 64/006; H04W 24/08; H04W 4/027
  See application file for complete search history.

(56) References Cited

U.S. PATENT DOCUMENTS

| 6,464,144 | B1 | 10/2002 | Swartz et al. | |
|---|---|---|---|---|
| 2006/0010699 | A1* | 1/2006 | Tamura | G01C 17/28 33/355 R |
| 2006/0245300 | A1* | 11/2006 | De Kok | G01V 1/38 367/15 |
| 2008/0305735 | A1 | 12/2008 | Farnsworth et al. | |
| 2010/0048167 | A1 | 2/2010 | Chow et al. | |
| 2013/0046505 | A1* | 2/2013 | Brunner | G01C 21/165 702/141 |
| 2014/0009256 | A1* | 1/2014 | Dubovik | G06F 3/017 340/4.31 |
| 2014/0149145 | A1* | 5/2014 | Peng et al. | 705/4 |
| 2014/0330530 | A1* | 11/2014 | Pistre | G01V 9/02 702/50 |

OTHER PUBLICATIONS

Wayne Jansen and Vlad Korolev "A Location-Based Mechanism for Mobile Device Security", Mar. 2009, pp. 1-6, World Congress on Computer Science and Information Engineering. Retrieved from the internet: http://csrc.nist.gov/groups/SNS/mobile_security/documents/mobile_devices/security-beacons-final-werb.pdf.
Prashanth Mohan, et al. "Nericell: Rich Monitoring of Road and Traffic Conditions using Mobile Smartphones", Nov. 2008, 14 sheets, Microsoft Research, Bangalore, India.
Ravi Bhoraskar "Wolverine: Traffic and Road Condition Estimation using Smartphone Sensors", May 4, 2012, 53 sheets, IIT Bombay.
Rotating One Vector About Another, Feb. 16, 1992, 4 sheets [retrieved on Feb. 21, 2013], retrieved from the internet: http://hollasch.net/cgindex/math/rotvec/html.

(Continued)

*Primary Examiner* — Magdi Elhag
(74) *Attorney, Agent, or Firm* — Okamoto & Benedicto LLP

(57) ABSTRACT

Calibration of vehicle and smartphone coordinate systems includes receiving acceleration data from an accelerometer of the smartphone. The smartphone identifies a Y-axis, a Z-axis, and an X-axis of the coordinate system of the vehicle relative to a coordinate system of the smartphone from the raw acceleration data. The smartphone generates processed acceleration data by transforming the raw acceleration data into the coordinate system of the smartphone. The processed acceleration data is used to detect driving conditions of the vehicle.

6 Claims, 11 Drawing Sheets

(56) References Cited

OTHER PUBLICATIONS

Peak Finding and Measurement, Feb. 2013, 8 sheets [retrieved on Feb. 21, 2013], retrieved from the internet: http://terpconnect.umd.edu/~toh/spectrum/PeakFindingand Measurement.htm.

Angle between two vectors—Newsreader—MATLAB Central, Jul. 9, 2007, 38 sheets [retrieved on Feb. 21, 2013], retrieved from the internet: http://www.mathworks.com/matlabcentral/newsreader/view_thread/151925.

* cited by examiner

US 9,253,603 B1

ACCELEROMETER-BASED CALIBRATION OF VEHICLE AND SMARTPHONE COORDINATE SYSTEMS

BACKGROUND OF THE INVENTION

1. Field of the Invention

The present invention relates generally to smartphones, and more particularly but not exclusively to methods and apparatus for calibrating vehicle and smartphone coordinate systems.

2. Description of the Background Art

Smartphones are mobile telephones that include computing resources for data processing and data communications. Some smartphones further include various sensors, such as a 3-axis accelerometer and a 3-axis magnetic field sensor, and have an integrated global positioning system (GPS). Examples of currently-available smartphones include the APPLE IPHONE and ANDROID smartphones.

Smartphone sensors may be employed in a variety of vehicle-related applications, such as driving habits detection, car accident detection, and the like. Because the orientation of a smartphone relative to a vehicle varies depending on how the user (driver or passenger) of the vehicle carries the smartphone, these vehicle-related applications require calibration of the coordinate system of the smartphone to that of the vehicle. More particularly, information from smartphone sensors is relative to the smartphone, not the vehicle. Therefore, to understand the movement of the vehicle, information from smartphone sensors need to be translated in terms of the vehicle's coordinate system.

One calibration method involves mounting the smartphone at a fixed position that is aligned with the vehicle's coordinate system. Although this calibration method is relatively simple, it is inconvenient to the user as the smartphone needs to be manually mounted and dismounted. This method also prevents or makes it difficult to use the smartphone for other purposes.

Another method of calibrating the coordinate systems of the smartphone and the vehicle requires the use of a GPS and a 3-axis magnetic field sensor. In this method, the smartphone's coordinate system is transferred to the world's coordinate system using sensor information from the smartphone's accelerometer and the 3-axis magnetic field sensor. The world's coordinate system is then transferred to the vehicle's coordinate system using GPS information. Although this method works independent of the orientation of the smartphone, not all smartphones are equipped with a GPS. Furthermore, GPS increases power consumption of the smartphone, is not available in certain locations, and may be inaccurate depending on the smartphone.

SUMMARY

In one embodiment, calibration of vehicle and smartphone coordinate systems includes receiving acceleration data from an accelerometer of the smartphone. The smartphone identifies a Y-axis, a Z-axis, and an X-axis of the coordinate system of the vehicle relative to the coordinate system of the smartphone from the raw acceleration data. The smartphone generates processed acceleration data by transforming the raw acceleration data into the coordinate system of the smartphone. The processed acceleration data may be used to detect driving conditions of the vehicle.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
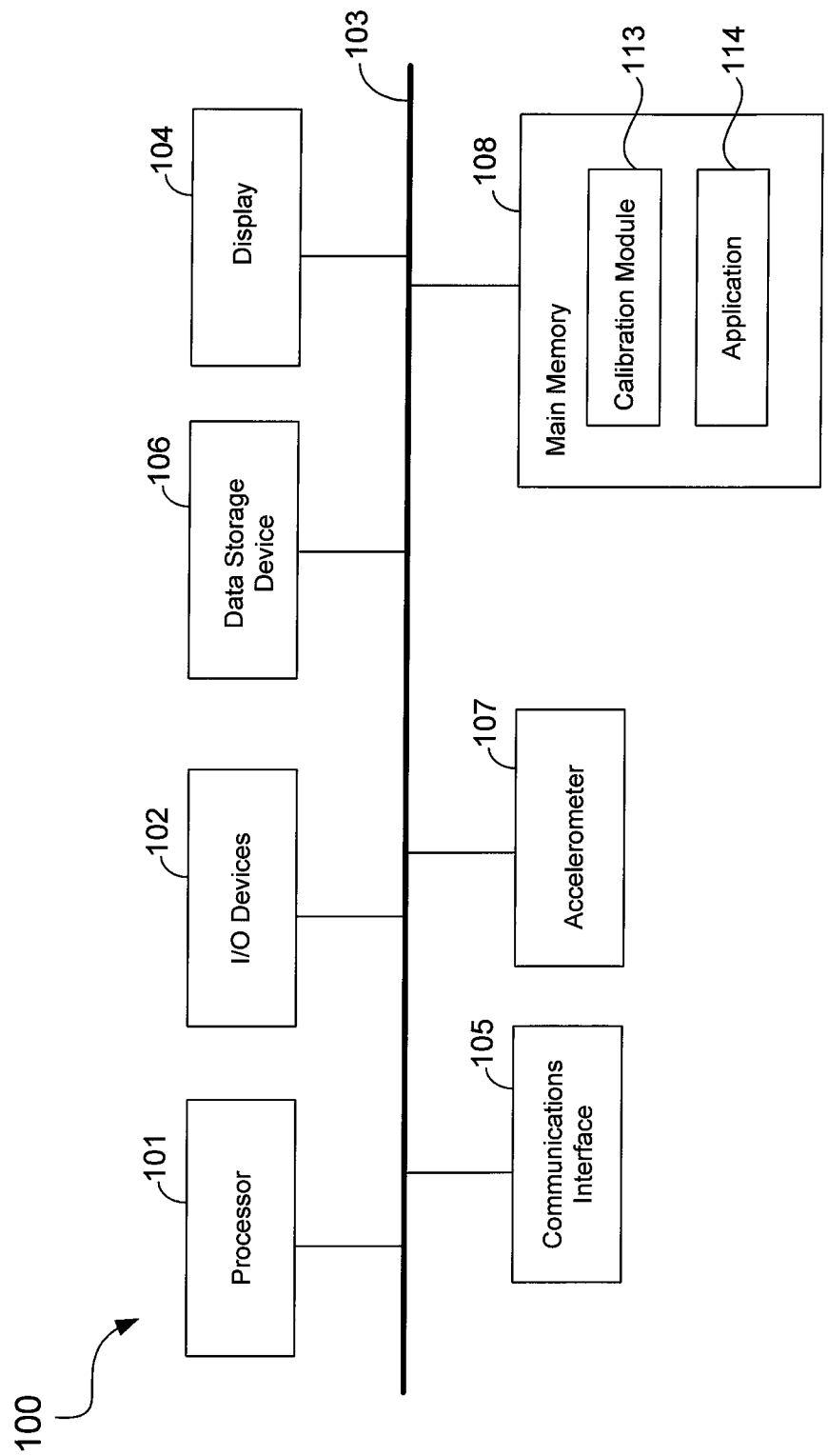
FIG. 1 shows a schematic diagram of a smartphone in accordance with an embodiment of the present invention.

Referring now to FIG. 1, there is shown a schematic diagram of a smartphone 100 in accordance with an embodiment of the present invention. In the example of FIG. 1, the smartphone 100 includes a processor 101, a bus 103 coupling its various components, I/O devices 102 (e.g., keyboard, touch screen), a data storage device 106 (e.g., flash memory), a display 104, a communications interface 105 (e.g., wireless network adapter, wireless modem, radio, cellular interface), and a main memory 108 (e.g., random access memory). The communications interface 105 may be coupled to a wireless computer network, 3G network, cellular network, and other wireless communications network or infrastructure for data and/or voice transmission.

The smartphone 100 further includes an accelerometer 107, which in one embodiment comprises a 3-axis accelerometer for measuring acceleration forces. The smartphone 100 may include additional sensors, but they are not necessary to perform the smartphone-vehicle coordinate system calibration described herein. For example, in one embodiment, the smartphone 100 does not have a GPS, making the calibration techniques described herein especially suitable with the smartphone 100.

The smartphone 100 is a particular machine as programmed with computer-readable program code. The smartphone 100 includes computer-readable program code loaded non-transitory in the main memory 108 for execution by the processor 101. In the example of FIG. 1, the smartphone 100 includes computer-readable program code (i.e., computer instructions or software) modules in the form of a coordinate system calibration module 113 and one or more applications 114. The smartphone 100 may be running an APPLE IOS operating system or an ANDROID operating system, for example.

The calibration module 113 may comprise computer-readable program code for calibrating the coordinate systems of the smartphone 100 and a vehicle. The calibration module 113 may also be implemented as firmware or programmed logic hardware.

In one embodiment, the calibration module 113 receives raw acceleration data that are generated by the accelerometer 107, determines a gravity vector that represents the Z-axis vector of the vehicle in the coordinate system of the smartphone from the raw acceleration data, uses the gravity vector to decompose linear acceleration data into vertical vectors and horizontal vectors, analyzes the horizontal vectors to identify the X-axis vector of the vehicle in the coordinate system of the smartphone, identifies the Y-axis vector of the vehicle from the X-axis and Z-axis vectors of the vehicle, and generates processed acceleration data by transforming the raw acceleration data from the smartphone's coordinate system into the vehicle's coordinate system.

An application 114 may comprise an application program, referred to as an "app" in the art of smartphones, for receiving processed acceleration data from the calibration module 113. Processed acceleration data is acceleration data along the vehicle's coordinate system, and is thus useful in determining acceleration force vectors, i.e., acceleration force magnitude and direction, relative to the vehicle's orientation. The application 114 may use the processed acceleration data to detect driving conditions, such as collisions, road conditions, drunk driving, driving habits of the driver, and other conditions that may be detected based on acceleration forces on the vehicle.

Figure 2:
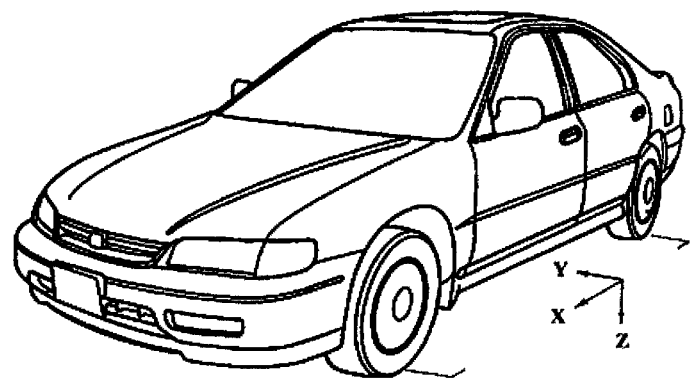
FIG. 2 shows a coordinate system of a vehicle in accordance with an embodiment of the present invention.

FIG. 2 shows a coordinate system of a vehicle in accordance with an embodiment of the present invention. In the example of FIG. 2, the vehicle coordinate system is a rectangular coordinate system with a positive X-axis going towards the front of the vehicle, a positive Z-axis going down to the ground, and a positive Y-axis going to the right of the vehicle (as viewed from the back of the vehicle; see FIG. 2).

Figure 3:
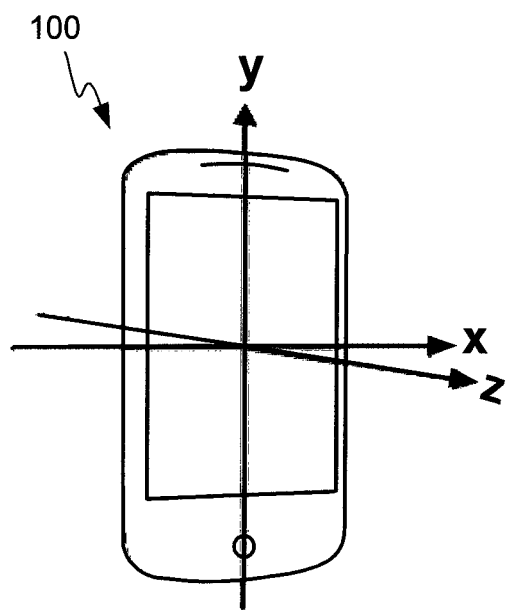
FIG. 3 shows a coordinate system of a smartphone in accordance with an embodiment of the present invention.

FIG. 3 shows a coordinate system of the smartphone 100 in accordance with an embodiment of the present invention. In the example of FIG. 3, the coordinate system of the smartphone 100 is rectangular with a positive Y-axis going up the smartphone 100, a positive Z-axis going out of the plane of the front of the smartphone 100, and a positive X-axis going to the right of the smartphone 100 (as viewed facing the smartphone 100; see FIG. 3). As can be appreciated, the orientation of the coordinate systems of the vehicle and the smartphone 100 may be different from that shown in FIGS. 2 and 3 without detracting from the merits of the present invention. As will be more apparent below, once the coordinate system of the smartphone 100 is calibrated to the coordinate system of the vehicle, or vice versa, raw acceleration data from the accelerometer 107 of the smartphone 100 may be translated to acceleration data on the vehicle's coordinate system.

Figure 4:
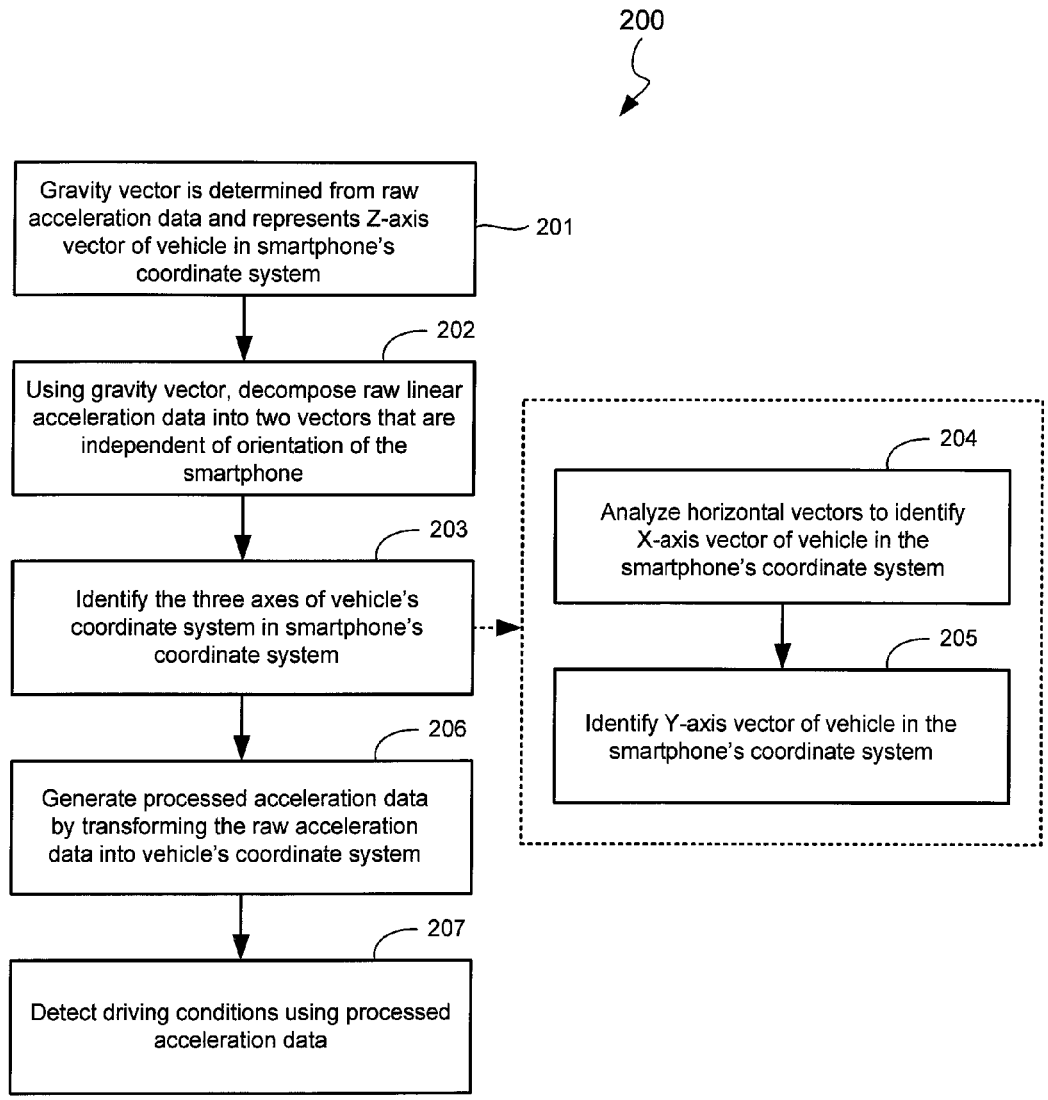
FIG. 4 shows a flow diagram of a method of calibrating a coordinate system of a smartphone to a coordinate system of a vehicle in accordance with an embodiment of the present invention.

FIG. 4 shows a flow diagram of a method 200 of calibrating a coordinate system of a smartphone to a coordinate system of a vehicle in accordance with an embodiment of the present invention. The method 200 may be performed by the calibration module 113. The smartphone 100 may be carried by the driver or passenger (e.g., in a pocket) or casually placed somewhere in the vehicle, such as in a glove compartment, inside a bag, on a seat, etc.

In the example of FIG. 4, raw acceleration data, i.e., unprocessed acceleration data as received from the accelerometer 107, is relative to the coordinate system of the smartphone 100. Raw acceleration data is composed of gravitational acceleration, represented as a gravity vector G, and linear acceleration caused by external force other than gravity. The calibration module 113 determines the gravity vector G from the raw acceleration data and uses the gravity vector G to represent the Z-axis vector of the vehicle in the smartphone's coordinate system (step 201). Using the gravity vector G, calibration module 113 decomposes the raw linear acceleration data, which are obtained from the raw acceleration data, into two vectors that are independent of the orientation of the smartphone 100 (step 202), such as into a vertical vector V and a horizontal vector H. The vertical vector V aligns with the direction of the gravity vector gravity vector G, and the horizontal vector H is in a horizontal plane that is perpendicular to the gravity vector G.

The calibration module 113 analyzes all horizontal vectors H detected within a time interval to identify the X-axis, the Y-axis, and the Z-axis of the vehicle's coordinate system in the coordinate system of the smartphone 100 (step 203). In one embodiment, the calibration module 113 identifies the three axes of the coordinate system of the vehicle by analyzing the horizontal vectors H to identify the X-axis vector of the vehicle in the coordinate system of the smartphone 100 (step 204) and by identifying the Y-axis vector of the vehicle in the coordinate system of the smartphone 100 (step 205). The Z-axis vector of the vehicle in the coordinate system of the smartphone may be obtained from the gravity vector G, and the Y-axis vector of the vehicle in the coordinate system of the smartphone may be obtained from a cross-product of the Z-axis and X-axis vectors of the vehicle.

In one embodiment, the calibration module 113 identifies the X-axis vector of the vehicle in the coordinate system of the smartphone 100 by detecting the straight-line accelerated and decelerated motions of the vehicle within a time interval. More particularly, within a period of time, the straight-line accelerations and decelerations of the vehicle will be much more frequent than turning and lane change motions. The straight-line accelerations and decelerations are also relatively balanced. Ideally, accelerated and decelerated motions in a straight line generate acceleration vectors along the positive X-axis and negative X-axis directions, respectively. In practice, considering various noises, the statistic rule is that the number of horizontal vectors H near or on the X-axis can take a large proportion in all of the horizontal vectors H, and is relatively balanced along the positive and negative directions of the X-axis within a period of time. In one embodiment, the calibration module 113 identifies the X-axis vector of the vehicle by detecting for horizontal vectors in accordance with the just-mentioned statistic rule.

After identifying the X-axis vector of the vehicle in the coordinate system of the smartphone 100, the calibration module 113 may identify the Y-axis vector of the vehicle in the coordinate system of the smartphone 100 from the cross-product of the Z-axis and X-axis vectors of the vehicle in the coordinate system of the smartphone 100. The X-axis vector, Y-axis vector, and Z-axis vector of the vehicle represent the positive X-axis, positive Y-axis, and positive Z-axis of the vehicle's coordinate system, respectively. Therefore, at this point of the method 200, the three axes of the coordinate system of the vehicle in the coordinate system of the smartphone 100 have been identified. This allows the calibration module 113 to transform raw acceleration data (which is relative to the coordinate system of the smartphone 100) into the coordinate system of the vehicle (step 206). That is, given raw acceleration data from the accelerometer 107, the calibration module 113 is now able to transform the raw acceleration data into processed acceleration data, which indicates acceleration force vectors along the coordinate system of the vehicle. The calibration module 113 may provide the processed acceleration data to the application 114, which may use the processed acceleration data to detect the movement of the vehicle for various purposes, including detection of driving conditions (step 207).

Figure 5:
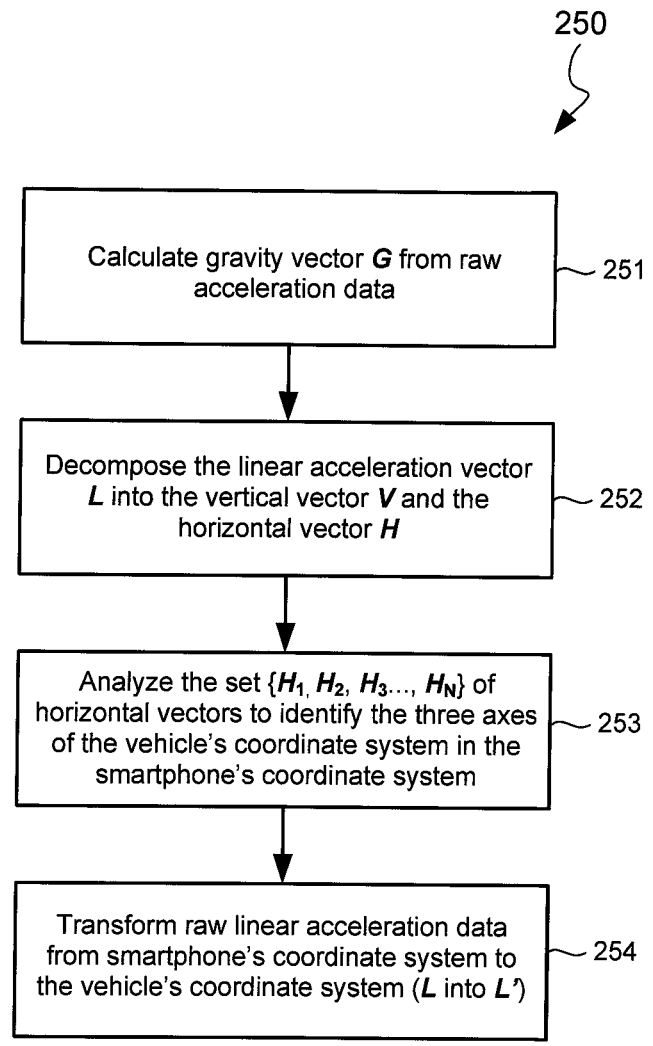
FIG. 5 shows a flow diagram of a method of calibrating a coordinate system of a smartphone to a coordinate system of a vehicle in accordance with an embodiment of the present invention.

FIG. 5 shows a flow diagram of a method 250 of calibrating a coordinate system of a smartphone to a coordinate system of a vehicle in accordance with an embodiment of the present invention. The method 250 is a particular version of the earlier described method 200. The method 250, and the following method 260 of FIG. 6 and method 270 of FIG. 7, may be performed by the calibration module 113. In the methods 250, 260, and 270, a t time interval is expressed in T seconds, the accelerometer sampling rate is expressed in F Hz, the number of total sampling points N in one time interval is T*F, and a raw acceleration vector A measured at a sampling point in T is expressed as $(A_X, A_Y, A_Z)$.

Referring first to the method 250 of FIG. 5, the calibration module 113 calculates the gravity vector G from raw acceleration data generated by the accelerometer 107 (step 251). The gravity vector G may be calculated by applying a low pass filter to the raw acceleration data or by using other algorithms. In one embodiment, a simple averaging-based algorithm is employed to calculate the gravity vector G as follows:

$$G = (G_X, G_Y, G_Z) \quad \text{(EQ. 1)}$$

where $G_X$, $G_Y$ and $G_Z$ are averages of all the measurements on those respective axes for the time interval. The linear acceleration vector L caused by an external force other than gravity may be expressed as, $$L = (A_X - G_X, A_Y - G_Y, A_Z - G_Z) \quad \text{(EQ. 2)}$$

After calculating the gravity vector G, the calibration module 113 decomposes a linear acceleration vector L into a vertical vector V and a horizontal vector H (step 252). The vertical vector V is the projection of the linear acceleration vector L upon the vertical axis represented by the gravity vector G. The vertical vector V may be calculated using one of several methods, e.g., projection angle or vector dot products such as in EQ. 3.

$$V = \left(\frac{L * G}{G * G}\right) G \quad \text{(EQ. 3)}$$

A 3-dimensional (3D) vector is a sum of vertical and horizontal components, so $$H = L - V \quad \text{(EQ. 4)}$$

In theory, a horizontal vector H can point to any direction on the horizontal plane that is perpendicular to a vertical vector V.

The calibration module 113 analyzes a set $\{H_1, H_2, H_3, \ldots, H_N\}$ of horizontal vectors to identify the three axes of the vehicle's coordinate system in the coordinate system of the smartphone 100 (step 253). In one embodiment, this processing step is performed by the calibration module 113 using the method 260 of FIG. 6.

Figure 6:
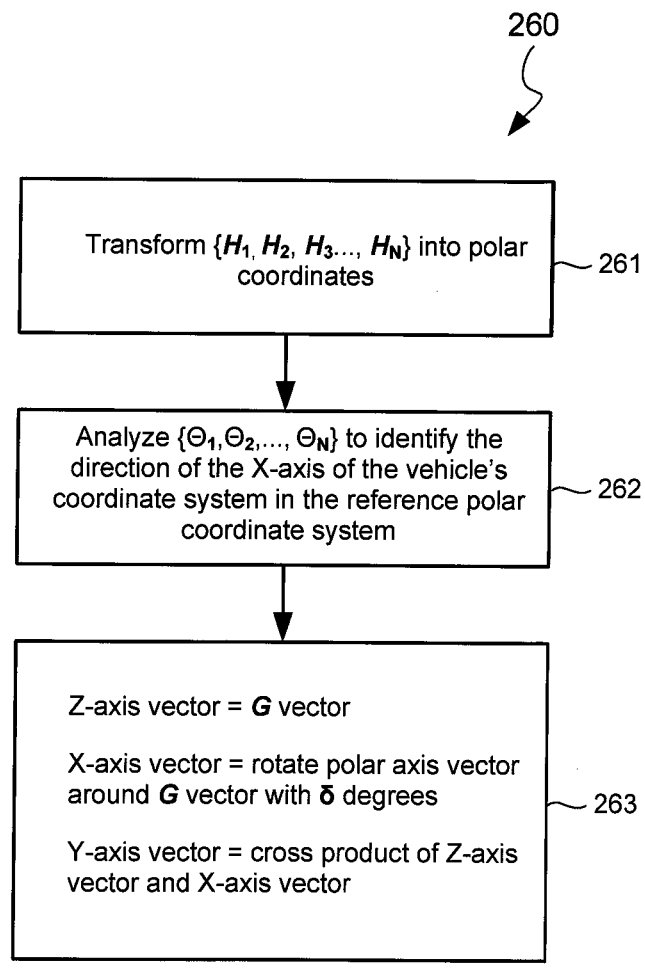
FIG. 6 shows a flow diagram of a method of identifying the three axes of a coordinate system of a vehicle in a smartphone's coordinate system in accordance with an embodiment of the present invention.
Figure 8:
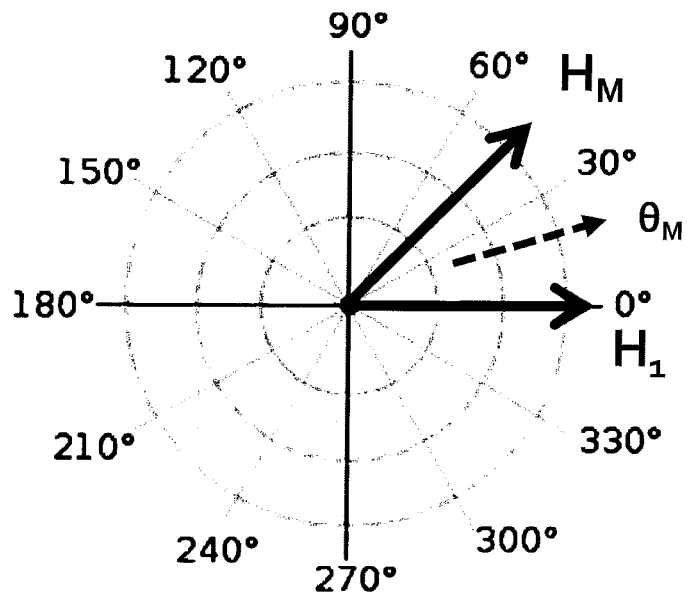
FIG. 8 illustrates an example polar angle in accordance with an embodiment of the present invention.

FIG. 6 shows a flow diagram of the method 260 of identifying the X-axis, Y-axis, and Z-axis of the coordinate system of the vehicle in the smartphone's coordinate system in accordance with an embodiment of the present invention. In the method 260, the calibration module 113 converts the set $\{H_1, H_2, H_3, \ldots, H_N\}$ of horizontal vectors from the coordinate system of the smartphone 100 into a reference polar coordinate system (step 261). This processing step may involve the calibration module 113 randomly choosing a horizontal vector H from the target set of horizontal vectors, e.g., $H_1$. The calibration module 113 then calculates the angle $\ominus_M$ (0°~360° between the polar axis horizontal vectors $H_1$ and $H_M$ (M∈{1, ..., N}) as the polar angle. FIG. 8 shows an example polar angle $\ominus_M$ that is between the horizontal vectors $H_1$ and $H_M$.

The calibration module 113 analyzes the set $\{\ominus_1, \ominus_2, \ldots, \ominus_N\}$ of polar angles to identify the direction of the X-axis of the coordinate system of the vehicle in the reference polar coordinate system (step 262). In one embodiment, this processing step is performed by the calibration module 113 using the method 270 of FIG. 7.

Figure 7:
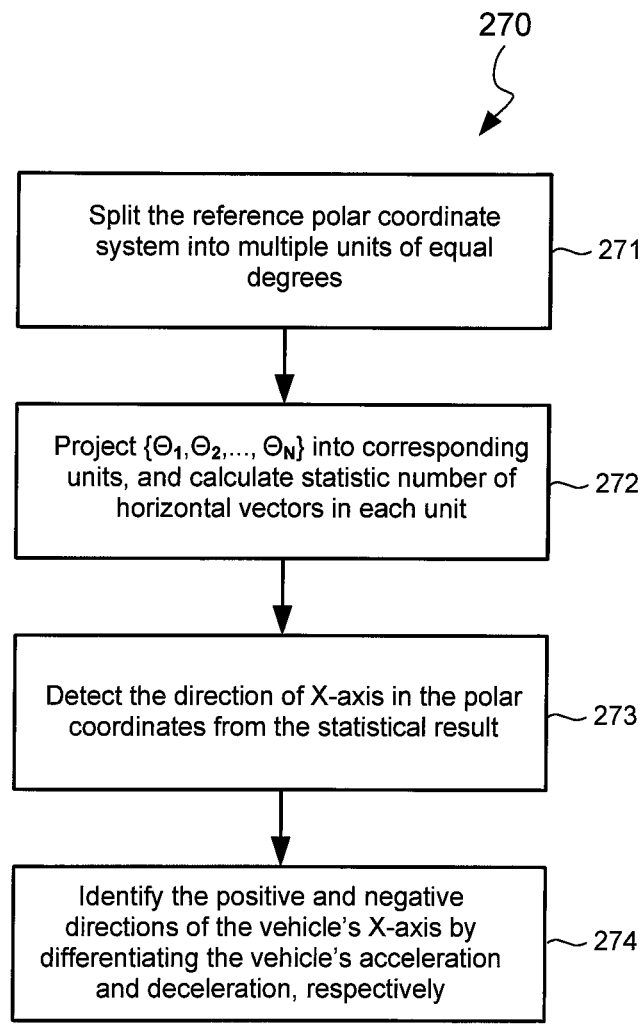
FIG. 7 shows a flow diagram of a method of identifying a direction of an X-axis of a coordinate system of a vehicle in a reference polar coordinate system in accordance with an embodiment of the present invention.
Figure 9:
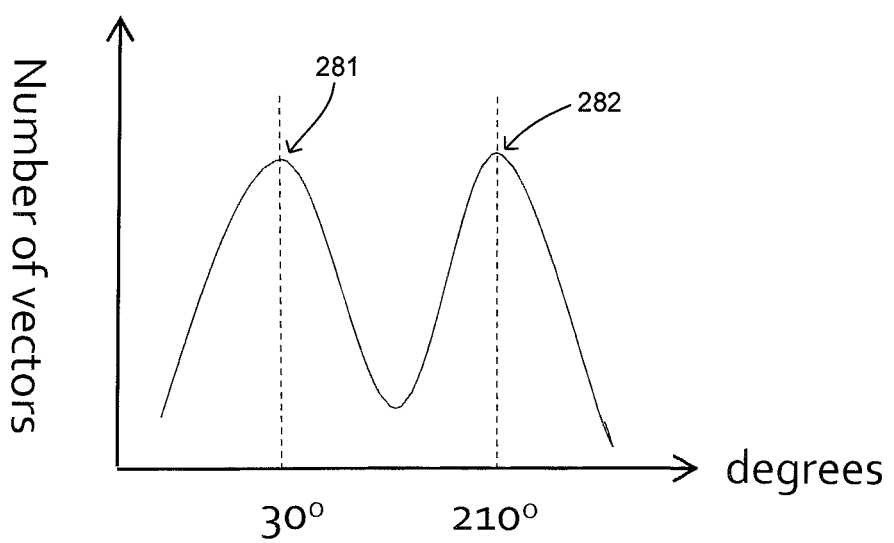
FIG. 9 shows a plot of a number of horizontal vectors versus polar angles in accordance with an embodiment of the present invention.

FIG. 7 shows a flow diagram of the method 270 of identifying the direction of the X-axis of the coordinate system of the vehicle in the reference polar coordinate system in accordance with an embodiment of the present invention. In the method of 270, the reference polar coordinate system, which is circular, is split into multiple units that each has the same degree angle (step 271). For example, when the angle of a unit is chosen to be 1 degree, the polar coordinate system is divided into 360 units. The set $\{\theta_1, \theta_2, \ldots, \theta_N\}$ of polar angles is projected into corresponding units; the statistic number of horizontal vectors H in each unit is then calculated (step 272). The direction of the X-axis of the vehicle's coordinate system in the reference polar coordinate system may then be detected from the statistic result by looking for two peaks that indicate accelerated and decelerated motions (step 273). That is, according to statistic rule, two peaks will occur in the graph of statistic result, and the position interval of the two peaks will roughly be 180 degrees, e.g. as shown in FIG. 9 (see peaks 281 and 282).

Figure 10:
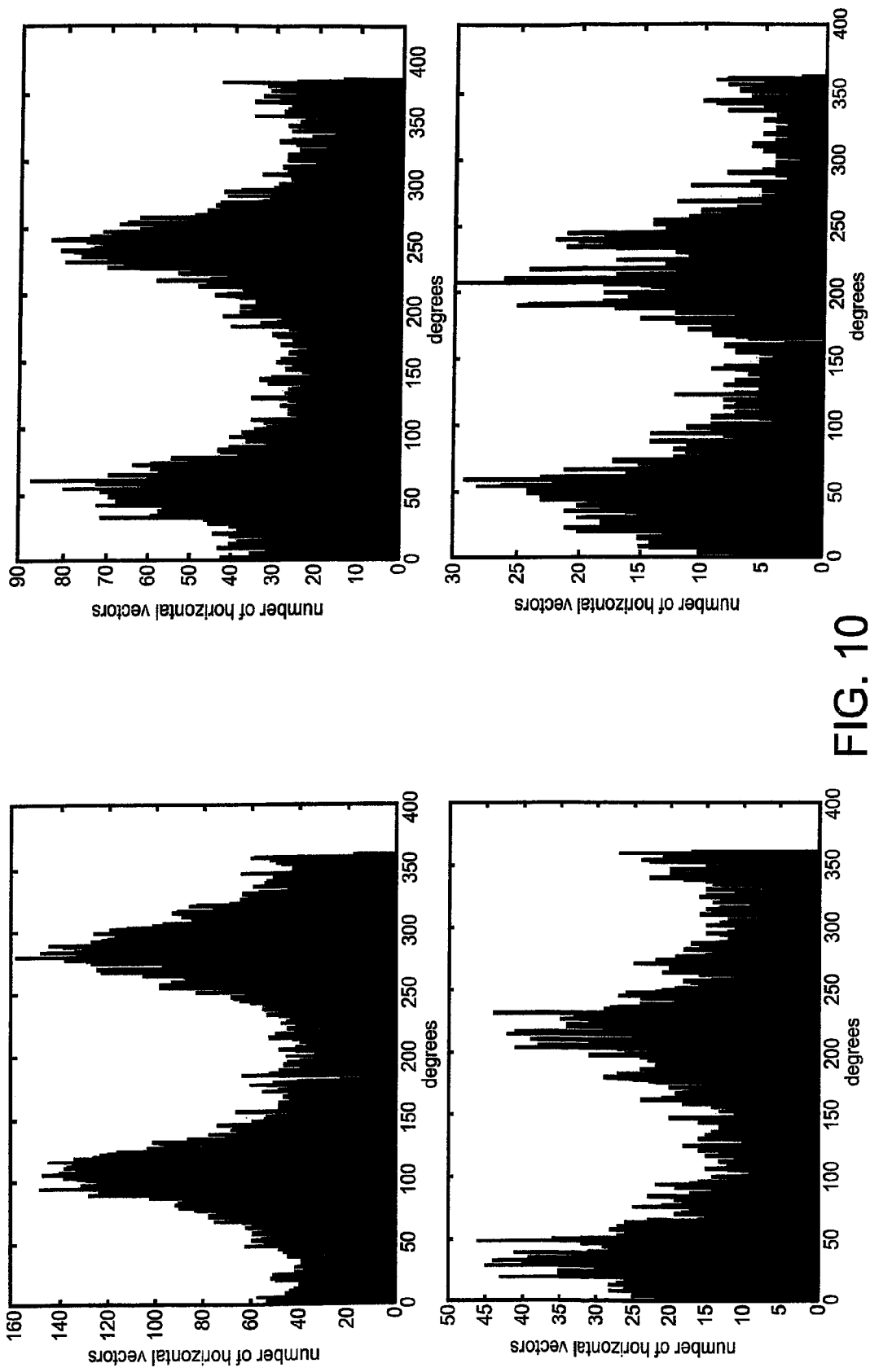
FIG. 10 shows graphs illustrating a number of horizontal vectors at particular polar angles in accordance with an embodiment of the present invention.
Figure 11:
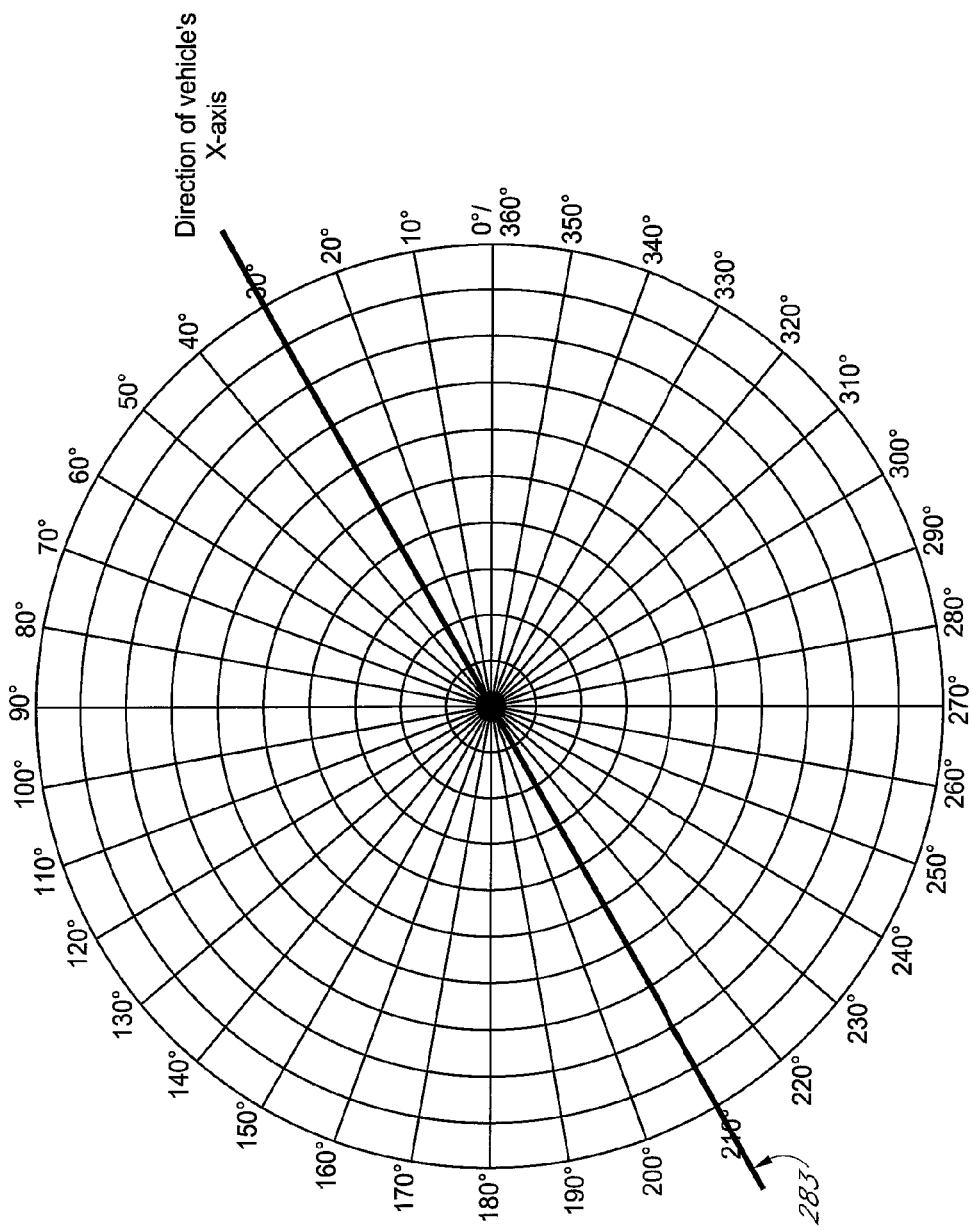
FIG. 11 illustrates alignment of an X-axis of a coordinate system of a vehicle with a line where two peaks are on in accordance with an embodiment of the present invention.

FIG. 10 shows graphs illustrating the number of horizontal vectors at particular polar angles in one embodiment of the present invention. The graphs of FIG. 10 are from real life samples taken during city driving or as a passenger. Note the two peaks separated by about 180 degrees. The horizontal vectors H having polar angles where a peak occurs are deemed to be along the X-axis of the vehicle. That is, in the reference polar coordinate system, the vehicle's X-axis aligns with the line where two peaks are on, such as illustrated in FIG. 11 (see line 283). The two peaks in the number of horizontal vectors H may be identified using conventional methods, including by well-known signal processing algorithms to help detect two peaks and extract the position of peaks, e.g. using a low-pass filter to reduce noise and a derivative-based method to detect two peaks.

Figure 12:
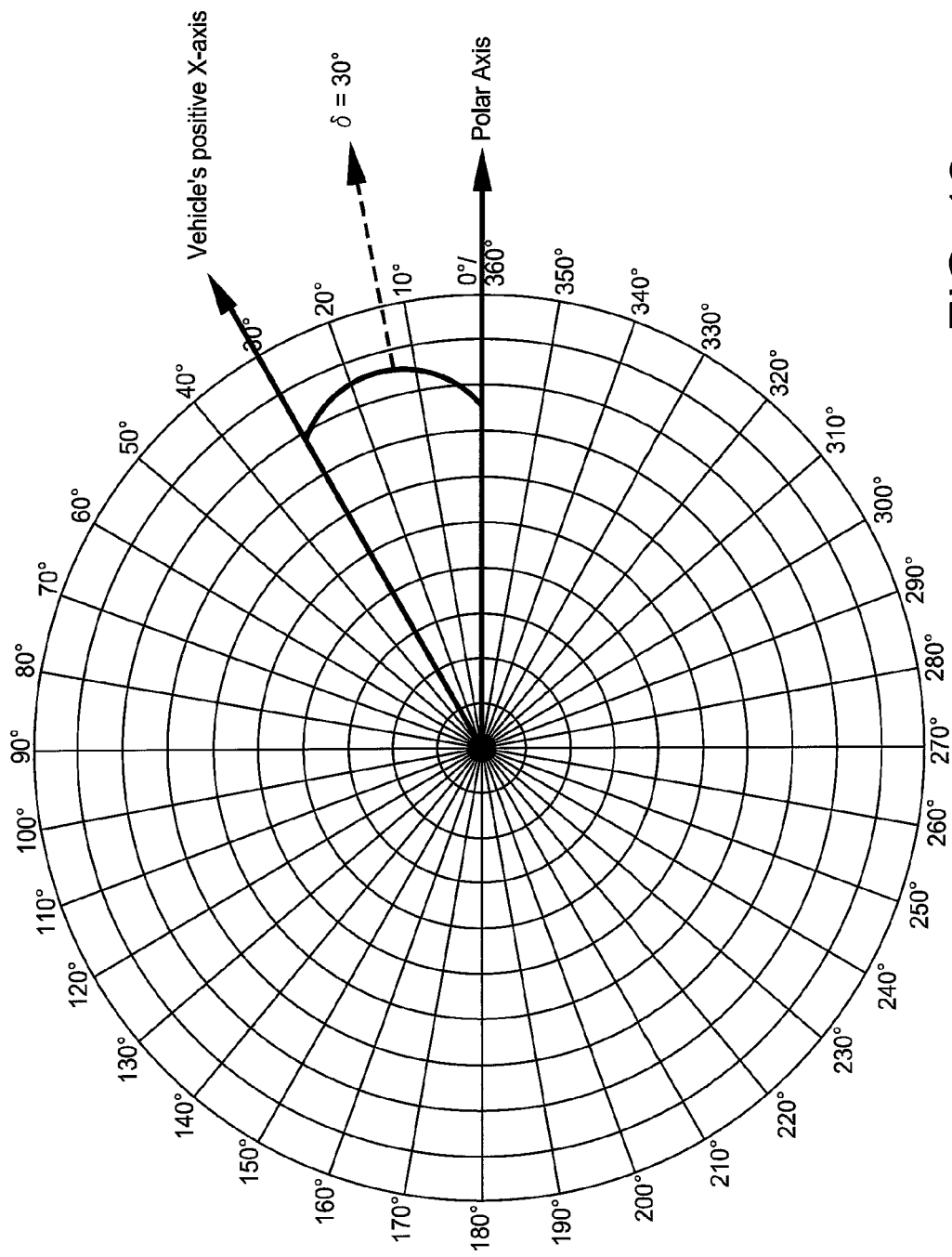
FIG. 12 illustrates a deviation angle at which a positive direction of an X-axis of a coordinate system of a vehicle deviates from a polar axis in accordance with an embodiment of the present invention.

Continuing the method 270 of FIG. 7, the positive and negative directions of the vehicle's X-axis may identified by differentiating the vehicle's acceleration and deceleration, respectively (step 274). One way of differentiating between acceleration and deceleration is by detecting for acceleration threshold because, generally, breaking can cause a surge or abrupt change in motion compared to acceleration. For example, the braking threshold may be 0.21 g within 4 seconds. After one peak is deemed to be caused by decelerated motions (e.g., braking), the other peak may be deemed to be caused by accelerated motions. Once the positive direction of the X-axis of the vehicle's coordinate system has been identified, the deviation angle δ at which the positive direction of the X-axis deviates from the polar axis is known, e.g., as illustrated in FIG. 12.

Returning to FIG. 6, after identifying the positive and negative directions of the X-axis of the vehicle's coordinate system in the reference polar coordinate system, the three axes of the vehicle in the coordinate system of the smartphone 100 are identified (step 263) as follows:

(a) Z-axis vector=the gravity vector G;
(b) X-axis vector=rotate polar axis vector around the gravity vector G by δ degrees, where δ is the deviation angle; and
(c) Y-axis vector=cross-product of Z-axis vector and X-axis vector.

Returning to FIG. 5, after identifying the three axes of the vehicle's coordinate system in the coordinate system of the smartphone 100, the calibration module 113 transforms the raw linear acceleration data from the coordinate system of the smartphone 100 to the vehicle's coordinate system (step 254). More particularly, the linear acceleration vectors L in the smartphone's coordinate system are transformed to the vehicle's coordinate system as linear acceleration vectors L'. This process step may be performed by using a rotation matrix R comprising the X-axis vector, Y-axis vector, and the Z-axis vector of the vehicle. For example, $$L'=R \times L \quad (EQ. 5)$$

$$R = \begin{bmatrix} X - \text{axis\_Vector} \\ Y - \text{axis\_Vector} \\ Z - \text{axis\_Vector} \end{bmatrix} \quad (EQ. 6)$$

where each row of the rotation matrix R represents the projections of the vehicle's axes onto the coordinate system of the smartphone 100.

Figure 13:
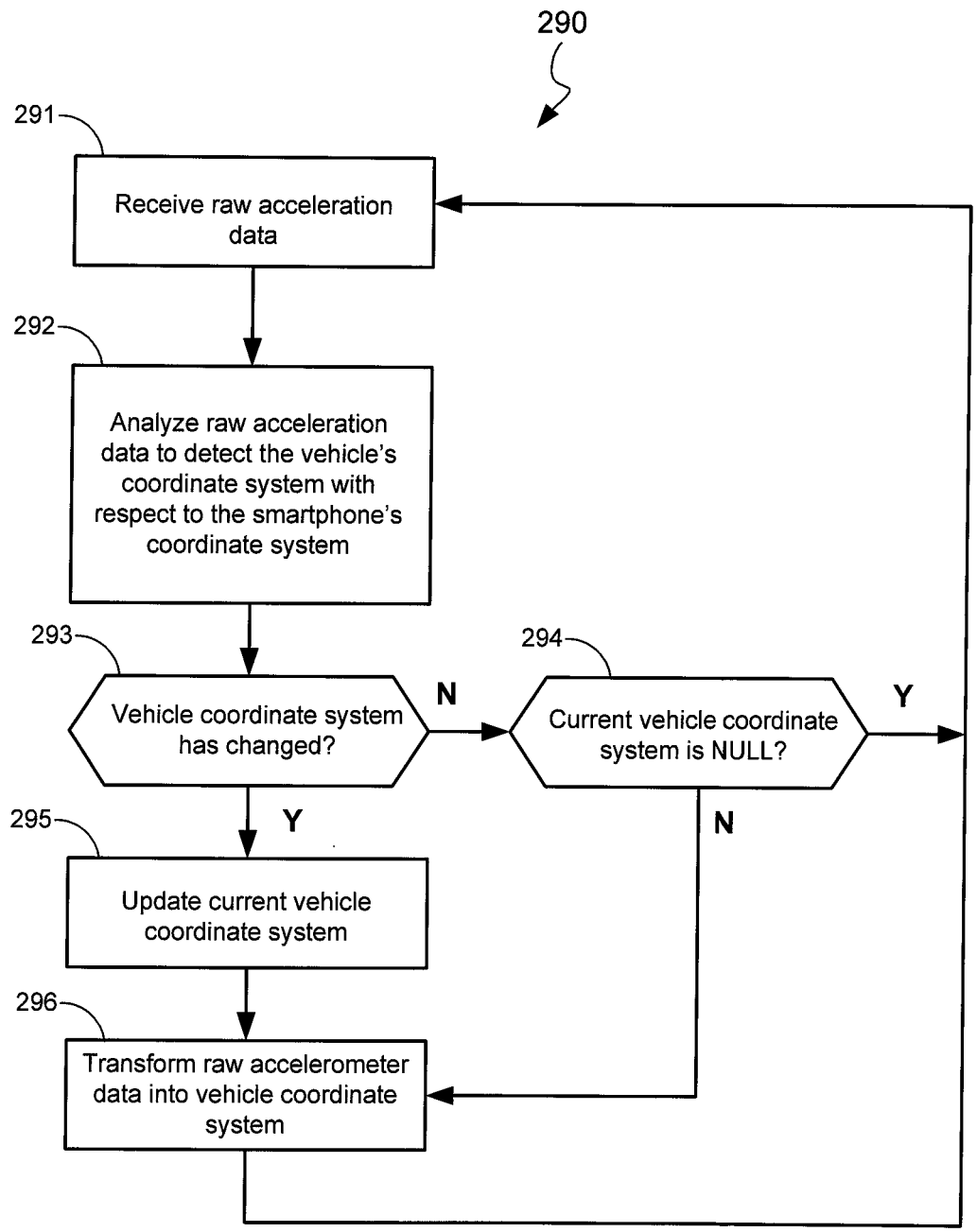
FIG. 13 shows a flow diagram of a method of processing raw acceleration data to calibrate the coordinate systems of a vehicle and a smartphone in accordance with an embodiment of the present invention.

FIG. 13 shows a flow diagram of a method 290 of processing raw acceleration data to calibrate the coordinate systems of a vehicle and a smartphone in accordance with an embodiment of the present invention. The method 290 may be performed by the calibration module 113 in a smartphone 100 that has an accelerometer 107 but does not have a GPS. As can be appreciated, because embodiments of the present invention only require acceleration data to detect the coordinate system of a vehicle relative to the coordinate system of a smartphone, embodiments of the present invention are much more useful and may be widely employed compared to other solutions. Furthermore, embodiments of the present invention are especially useful in smartphones because smartphones are regularly carried by drivers and passengers of vehicles.

In the beginning of the method 290, a time interval for performing the calibration (e.g., every few seconds) is chosen and the initial value of the vehicle's coordinate system is set to NULL, indicating no calibration has occurred. In one embodiment, the vehicle's coordinate system is represented by a rotation matrix R, which is set to NULL, i.e., with no values, during initialization. Thereafter, the calibration module 113 receives raw acceleration data generated by the accelerometer 107 (step 291). The calibration module 113 analyzes the raw acceleration data within a given time interval to detect the vehicle's coordinate system relative to the smartphone's coordinate system (step 292). This process step involves calibration of the smartphone's coordinate system to the vehicle's coordinate system using the raw acceleration data as previously described to generate a candidate rotation matrix R'. When the vehicle's coordinate system has remained NULL, the calibration module 113 loops back to receive and analyze raw acceleration data (path from step 293 to step 294 to step 291).

When the vehicle's coordinate system has changed, i.e., the candidate rotation matrix R' is different from the current rotation matrix R, the calibration module 113 updates the current rotation matrix R with the candidate rotation matrix R' (step 293 to step 295). That is, the candidate rotation matrix R' becomes the current rotation matrix (R=R'). The calibration module 113 keeps the current rotation matrix R when it has not changed and the current rotation matrix R is not NULL (path from step 293 to step 294 to step 296). The calibration module 113 then transforms the raw acceleration data into the vehicle coordinate system using the current rotation matrix R (step 296). The processed acceleration data, i.e., transformed to the vehicles coordinate system, may then be employed to detect driving conditions.

Methods and apparatus for calibrating vehicle and smartphone coordinate systems using acceleration data have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
receiving raw acceleration data generated by an accelerometer of a smartphone, the smartphone being in a vehicle;
identifying a gravity vector from the raw acceleration data;
using the gravity vector, decomposing raw linear acceleration data from the acceleration data into a vertical vector and a horizontal vector;
identifying a Y-axis, a Z-axis, and an X-axis of a coordinate system of the vehicle relative to a coordinate system of the smartphone from the raw acceleration data by identifying a Z-axis vector of the vehicle from the gravity vector, identifying an X-axis vector of the vehicle by analyzing a plurality of horizontal vectors detected within a time interval, and identifying a Y-axis vector of the vehicle by taking a cross product of the X-axis vector and the Z-axis vector of the vehicle;
generating processed acceleration data by transforming the raw acceleration data into the coordinate system of the vehicle; and
detecting a driving condition of the vehicle using the processed acceleration data.

2. The method of claim 1 wherein the smartphone does not have a global positioning system (GPS).

3. A computer-implemented method comprising:
receiving raw acceleration data generated by an accelerometer of a smartphone, the smartphone being in a vehicle;
determining a gravity vector from the raw acceleration data;
using the gravity vector, decomposing a linear acceleration vector into a vertical vector and a horizontal vector;
identifying an X-axis of a coordinate system of the vehicle by transforming a plurality of horizontal vectors to polar representation and identifying a direction of the X-axis of the coordinate system of the vehicle from angles of the polar representation of the plurality of horizontal vectors;
performing a cross-product of a Z-axis of the coordinate system of the vehicle with the X-axis of the coordinate system of the vehicle to identify the Y-axis of the coordinate system of the vehicle, the Z-axis being identified from the gravity vector; and
detecting an acceleration force vector on the vehicle by transforming the linear acceleration vector from a coordinate system of the smartphone to the coordinate system of the vehicle, the linear acceleration data being obtained from the raw acceleration data using the gravity vector.

4. The method of claim 3 wherein identifying the direction of the X-axis of the coordinate system of the vehicle comprises:
splitting a reference polar coordinate system into a plurality of units;
projecting the angles of the polar representation of the horizontal vectors into corresponding units in the plurality of units; and
detecting the direction of the X-axis of the coordinate system of the vehicle from statistics of the horizontal vectors in the plurality of units.

5. A smartphone comprising:
an accelerometer that generates raw acceleration data;
a processor; and
a memory comprising instructions executed by the processor to cause the smartphone to perform the steps of:
receiving raw acceleration data generated by an accelerometer of a smartphone, the smartphone being in a vehicle;
identifying a gravity vector from the raw acceleration data;
using the gravity vector, decomposing raw linear acceleration data from the acceleration data into a vertical vector and a horizontal vector;
identifying a Y-axis, a Z-axis, and an X-axis of a coordinate system of the vehicle relative to a coordinate system of the smartphone from the raw acceleration data by identifying a Z-axis vector of the vehicle from the gravity vector, identifying an X-axis vector of the vehicle by analyzing a plurality of horizontal vectors detected within a time interval, and identifying a Y-axis vector of the vehicle from a cross product of the X-axis vector and the Z-axis vector of the vehicle;
generating processed acceleration data by transforming the raw acceleration data into the coordinate system of the vehicle; and
detecting a driving condition of the vehicle using the processed acceleration data.

6. The smartphone of claim 5 wherein the smartphone does not have a global positioning system (GPS).

* * * * *